UNITED STATES PATENT OFFICE.

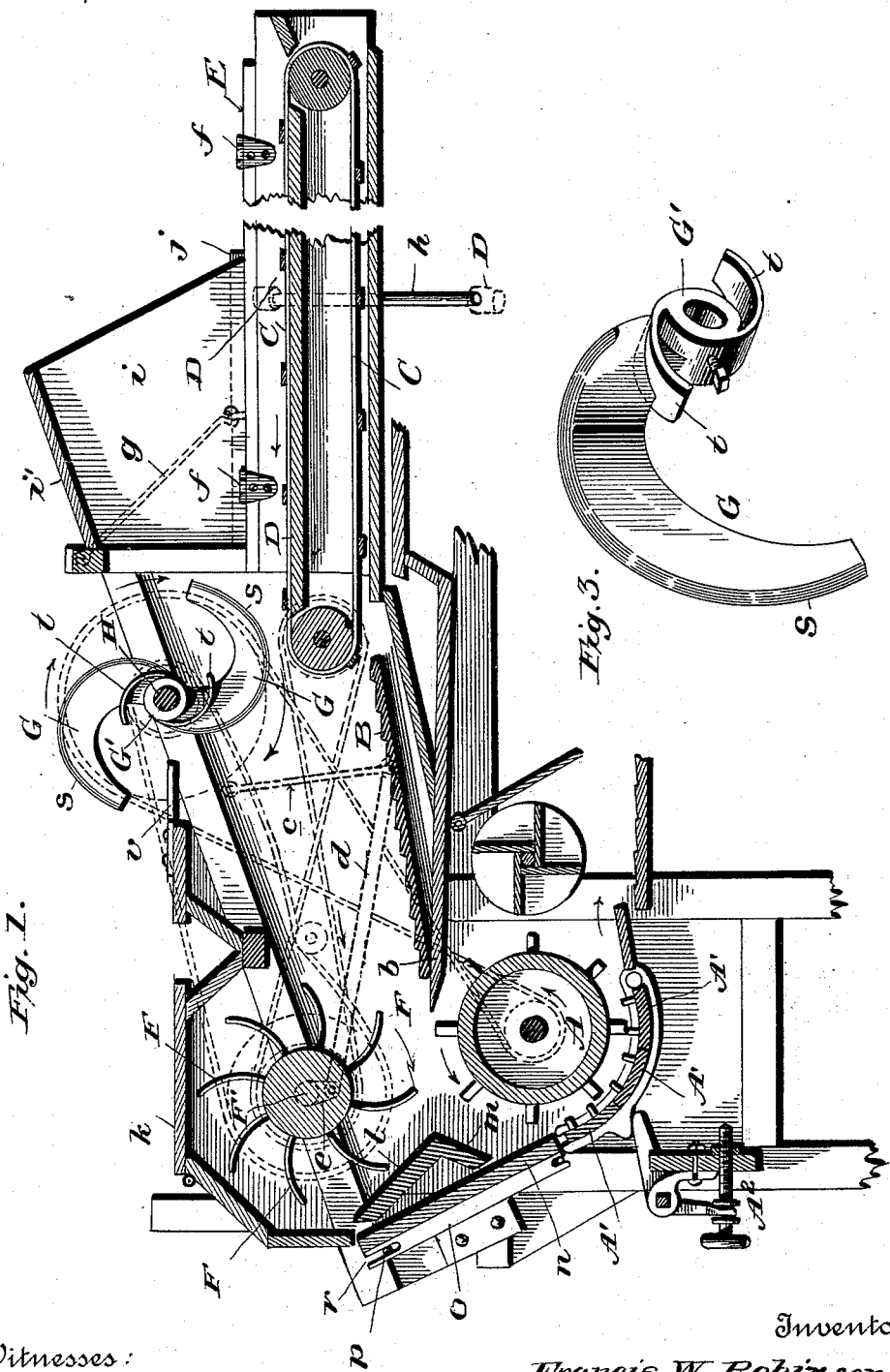

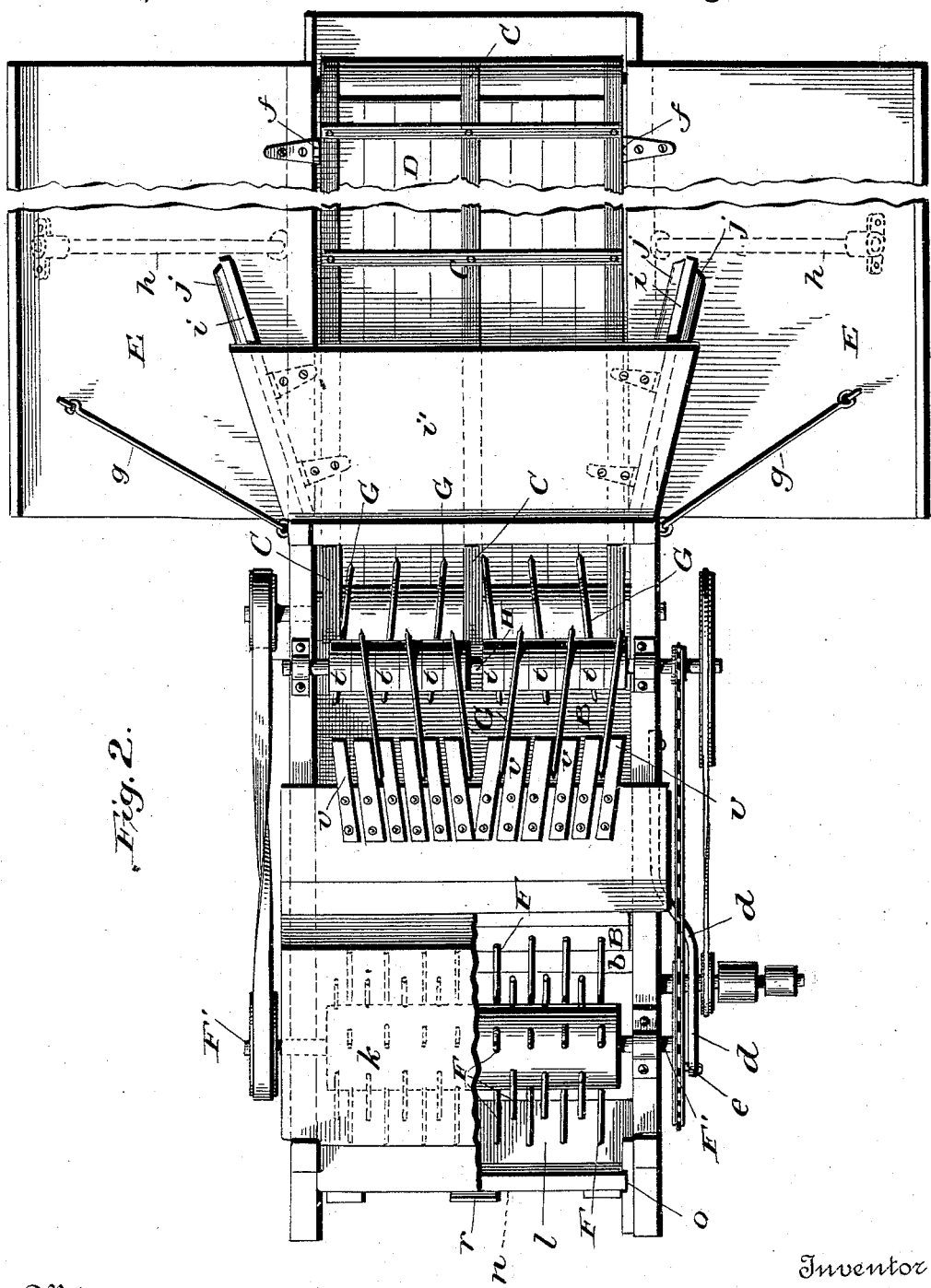

FRANCIS W. ROBINSON, OF RICHMOND, INDIANA, ASSIGNOR TO THE ROBINSON & COMPANY, OF SAME PLACE.

THRASHING-MACHINE.

SPECIFICATION forming part of Letters Patent No. 524,954, dated August 21, 1894.

Application filed April 10, 1894. Serial No. 506,999. (No model.)

*To all whom it may concern:*

Be it known that I, FRANCIS W. ROBINSON, of Richmond, in the State of Indiana, have invented certain new and useful Improvements in Thrashing-Machines, of which the following is a specification.

My invention has relation to the band cutting and feeding devices of thrashing machines.

The feeder in which my improvements are embodied is one having what may be termed an overshot feed—the straw being delivered above the thrashing cylinder, and the feeding devices being located on the deck of the machine. The straw after reaching the cylinder passes through the machine from front to rear as usual; but in traveling to the cylinder it moves from rear to front or in a direction the reverse of that in which it travels from the cylinder.

Under my invention the feeding devices are so arranged as to deliver the straw to the cylinder at a point substantially directly over the vertical center of the latter; and the picker is placed above and in immediate proximity to the cylinder with its axis in advance or forward of the axis of the latter. By this arrangement I am enabled both to locate the picker in a position where it will act most certainly and efficiently as a governor or regulator, and also to deliver the straw to the cylinder at a point where there will be no liability of its being thrown up into the picker or otherwise becoming entangled therewith. The arrangement furthermore has the advantage of being compact with all the parts readily accessible for manipulation or repairs. The cutter which I use is one composed of a series of segmental knives mounted upon a rotating shaft and combined with what I term whippers, which are shields projecting from the shaft with a scroll curve, and so arranged as to prevent the straw from wrapping around the cutter shaft or the hubs of the cutters mounted thereon.

These and other features of my invention will be pointed out in the course of the following description of the machine in connection with the accompanying drawings, in which—

Figure 1 is a longitudinal vertical central section of so much of a thrashing machine as needed to illustrate my improvements. Fig. 2 is a plan of the same with part of the picker cover removed. Fig. 3 is a perspective view of one of the segmental cutters or knives with its protecting scroll whippers.

In the drawings A is the cylinder located as usual at the front of the machine. It revolves in the direction of the arrow thereon and the straw passes from it over screens to the rear of the machine where it is discharged. The winnowing and separating devices may be of any approved kind and form no part of my invention. The concaves are shown at A'.

The feed to the cylinder is an overhead or overshot feed, the straw being delivered to the cylinder at a point about over its vertical center. The feed mechanism (which may be of any suitable kind) consists in this instance, of the inclined vibrating board or pan B, and the feed apron C. The vibrating board at its lower end rests upon the fixed supporting strip $b$, which is placed over and in close proximity to the cylinder; it stands about an inch or an inch and a half back of the vertical center of the cylinder, and being say seven-eighths of an inch in thickness itself, the straw as it passes forward will not reach the cylinder until it is over the vertical center of the latter. The vibrating board at its upper end is hung upon rods $c$ pinned at their upper ends to the frame of the machine, and it is vibrated back and forth by means of a connecting rod $d$ from a crank $e$ on the picker shaft.

The endless feed apron C is driven from the picker shaft by belting passing around a pulley on the front supporting roll of the apron. It is located in a feed trough D to the sides of which are hinged at $f$, tables E. These can be folded up one on top of the other and covering the feed trough; when unfolded each is held in horizontal position above by a hook $g$, attached to it and engaging a staple on the frame of the machine, and below by a post $h$ fitting in sockets on the frame of the machine and on the under side of the table respectively. These folding tables or platforms are to receive the straw or sheaves to be fed to the machine.

At the front end of the feed apron is a hood or guide funnel consisting of the two upright side pieces $i$, and the top cross piece $i'$, these parts being hinged together so that the legs or sides $i$ can fold flat down upon the top $i'$. When the device is unfolded, its legs rest upon the tables E, their lower ends being held between cleats $j$ on the tables. This folding arrangement is for convenience in moving. The tables folding down one upon the other and over the feed trough and apron protect the latter entirely from injury. Placed over and in proximity to the cylinder is the picker consisting of the shaft F' and the curved or bent arms or teeth F, of which there may be any suitable number—in this instance there are eight rows of teeth. The axis of the picker is in advance of that of the cylinder, and its teeth are placed in close proximity to those of the cylinder—the distance between the two in practice usually not exceeding an inch and a half. By this location and relative arrangement of the picker, feed mechanism and cylinder, I am enabled to control with certainty and efficiency the supply of straw to the cylinder, obtaining an even uniform feed without tendency to clog or slug.

The picker is provided with a suitable cover, the top $k$ of which is hinged so that it can be turned back whenever it is desired to have access to the picker. The front of the box inclosing the picker has an incline $l$ with a reverse incline $m$, the space between the strip $b$ and the point of junction of the two inclines forming a throat through which the straw passes to the cylinder, and the incline $m$ constituting a deflecting abutment for preventing the straw from passing up into the picker chamber.

The front of the cylinder chamber above the concaves A' is closed by the inclined chute board $n$ which is movable up and down in guide ways $o$ in the frame of the machine. It is permitted a limited movement of this character by a cross bolt $p$ which passes through a slot $r$ in the board and is secured at its ends to the frame—this capacity for such limited movement being to allow it to follow the movement of the concaves when the latter are adjusted up or down by their adjusting mechanism $A^2$, which mechanism, inasmuch as it is old and in general use, requires no description here.

By removing the cross bolt $p$, the chute board can be entirely raised or taken out, thus affording ready access to the cylinder and concaves whenever desired.

In connection with the feeding mechanism I use a band cutting device of any approved pattern. The preferred device for this purpose is shown in the accompanying drawings. It consists of a series of segmental knives or cutters G fixed upon a rotating cross shaft H placed above the feed apron at or near the front end of the latter and driven by belting from the cylinder—these cutters being set obliquely to the shaft so as to have a general volute or spiral form whereby they act not only as cutters but as spreaders, and being so shaped that their outer extremities terminate in portions $s$ concentric with the shaft H. The cutters G are separate from one another—each consisting of a blade or knife proper, and a hub G' which is secured upon the shaft H by a set screw or other suitable fastening.

A cutter of the form and construction thus far described is the subject of my prior application for Letters Patent filed June 10, 1892, Serial No. 436,243, and is not here claimed by me. Practical use however of such cutters has demonstrated that in working wet or damp straw, the latter will stick to and wrap around the cutter, particularly the parts of the shaft or hubs between the blades, to such an extent as to clog the running of the device, and to seriously impair its action. To remedy this I provide the scroll like whippers or shields $t$ which project in a scroll curve from the hubs, thus interposing between the hubs and the straw an effectual barrier which will prevent the latter from wrapping around the hubs or shaft.

The cutting blades work through a comb $v$ located in front of the cutters, the object of this being to clean and strip the blades of straw at each revolution.

The picker is driven from the band cutter by sprocket gearing as shown.

Having described my improvements and the best way now known to me of carrying the same into effect, what I claim herein as new, and desire to secure by Letters Patent, is as follows:

1. In a thrashing machine, the combination with the thrashing cylinder, of overshot feeding devices located on top of the machine, and arranged to deliver the straw to the cylinder at a point above the latter and about over its vertical center, and a rotating picker located above and in close proximity to the cylinder with its axis in advance of that of the cylinder, substantially as hereinbefore set forth.

2. The combination of the cylinder, the overshot feed comprising the feed apron and the vibrating board or pan having its delivery end above the cylinder and nearly over its vertical center, and the picker located above in close proximity to and in advance of the cylinder, substantially as hereinbefore set forth.

3. The combination of the cylinder, the overshot feed device having its delivery end above the cylinder and about over its vertical center, the picker located above and in advance of the cylinder and the guiding inclines $l$, $m$, substantially as and for the purposes hereinbefore set forth.

4. The combination with feeding devices of a rotating cutter shaft placed crosswise of said devices, segmental knives fixed to separate hubs mounted and assembled on said shaft and provided each with scroll whippers or guards, substantially as and for the purposes hereinbefore set forth.

5. The cylinder and its adjustable concaves in combination with the vertically movable chute board n, and means whereby it is permitted limited vertical movement to enable it to follow and adapt itself to the adjustment of the concaves, as set forth.

In testimony whereof I have hereunto set my hand, before two subscribing witnesses, this 5th day of April, 1894.

FRANCIS W. ROBINSON.

Witnesses:
 HENRY E. ROBINSON,
 HOMER HOCKETT.